(12) United States Patent
Kasahara

(10) Patent No.: US 10,706,580 B2
(45) Date of Patent: *Jul. 7, 2020

(54) POSITION-INFORMATION SPECIFYING METHOD, POSITION-INFORMATION SPECIFYING DEVICE, AND POSITION-INFORMATION SPECIFYING PROGRAM

(71) Applicant: Hajime Kasahara, Kanagawa (JP)

(72) Inventor: Hajime Kasahara, Kanagawa (JP)

(*) Notice: Subject to any disclaimer, the term of this patent is extended or adjusted under 35 U.S.C. 154(b) by 180 days.

This patent is subject to a terminal disclaimer.

(21) Appl. No.: 15/781,712

(22) PCT Filed: Dec. 6, 2016

(86) PCT No.: PCT/JP2016/086145
§ 371 (c)(1),
(2) Date: Jun. 6, 2018

(87) PCT Pub. No.: WO2017/099047
PCT Pub. Date: Jun. 15, 2017

(65) Prior Publication Data
US 2018/0276848 A1    Sep. 27, 2018

(30) Foreign Application Priority Data

Dec. 9, 2015  (JP) .................... 2015-240556
Mar. 7, 2016  (JP) .................... 2016-043810
Oct. 2, 2016  (JP) .................... 2016-195319

(51) Int. Cl.
*G06T 7/00* (2017.01)
*G06T 7/73* (2017.01)
(Continued)

(52) U.S. Cl.
CPC ............ *G06T 7/74* (2017.01); *G01C 3/06* (2013.01); *G06K 9/00791* (2013.01); *G06T 7/60* (2013.01);
(Continued)

(58) Field of Classification Search
CPC .......... A61B 1/0005; A61B 1/00009; A61B 2090/364; A61B 90/361; A61B 3/102;
(Continued)

(56) References Cited

U.S. PATENT DOCUMENTS

| 4,942,533 A | 7/1990 | Kakinami |
| 6,760,483 B1 * | 7/2004 | Elichai ............ G06T 7/60 |
| | | 382/233 |

(Continued)

FOREIGN PATENT DOCUMENTS

| JP | 63-226799 | 9/1988 |
| JP | 64-015605 | 1/1989 |

(Continued)

OTHER PUBLICATIONS

International Search Report issued in PCT/JP2017/035086, dated Nov. 21, 2017, pp. 1-4.

(Continued)

*Primary Examiner* — Aklilu K Woldemariam
(74) *Attorney, Agent, or Firm* — Jeffrey S. Melcher; Melcher Patent Law PLLC

(57) ABSTRACT

[Object]
To provide a position-information specifying method for accurately specifying a position and a velocity of a photographed object.

[Solution]
A position-information specifying method includes; a step for obtaining an object image 3 photographed by a monitor camera 2 having a predetermined distortion characteristic, a (Continued)

predetermined distortion being caused on the object image 3 due to the predetermined distortion characteristic; a step for obtaining a first scale plate image 42 corresponding to an image obtained when a first scale plate 4 having a first scale 41 is arranged at a first distance X is photographed by the monitor camera 2; a step for overlapping the first scale plate image 42 and the object image 3 with each other; a step for measuring an image-size A of a first reference object 5, which is appeared on the object image 3 and has a first predetermined size B, by using the first scale 41 of the first scale plate image 42; and a step for calculating a first target distance Y between the monitor camera 2 and the first reference object 5, based on the image-size A of the first reference object 5, the first predetermined size B, and the first distance X.

20 Claims, 16 Drawing Sheets

(51) Int. Cl.
| | | |
|---|---|---|
| *G01C 3/06* | (2006.01) | |
| *G08G 1/04* | (2006.01) | |
| *G06K 9/00* | (2006.01) | |
| *G06T 7/60* | (2017.01) | |
| *G08G 1/052* | (2006.01) | |

(52) U.S. Cl.
CPC ............. *G06T 7/97* (2017.01); *G08G 1/04* (2013.01); *G08G 1/052* (2013.01); *G06K 9/00825* (2013.01); *G06T 2207/10016* (2013.01); *G06T 2207/10024* (2013.01); *G06T 2207/30236* (2013.01); *G06T 2207/30252* (2013.01)

(58) Field of Classification Search
CPC ......... G01J 3/0278; G06T 2207/10016; G06T 7/70; G06T 7/55; G06T 7/593; G06T 7/74; G06T 7/251; G06T 7/80; G06T 2207/30252; G06T 7/97; G06T 2207/10024; G06T 2207/30236; G06T 7/60; H04N 2005/2255; H04N 5/23219; H04N 5/225; G01B 11/14; G01B 11/22; G01B 11/00; G02B 21/008; G06K 2009/2045; G06K 9/32; G06K 9/6202; G06K 9/00791; G06K 9/00825; G01C 3/06; G01C 3/08; G08G 1/00; G08G 1/04; G08G 1/052; G08G 1/054
USPC ........ 382/131, 233, 241, 154, 162, 284, 294
See application file for complete search history.

(56) References Cited

U.S. PATENT DOCUMENTS

| | | | | |
|---|---|---|---|---|
| 2004/0211883 | A1* | 10/2004 | Imagawa | G07C 9/00 250/208.1 |
| 2005/0196070 | A1* | 9/2005 | Takakura | G06K 9/228 382/284 |
| 2006/0045388 | A1* | 3/2006 | Zeineh | G02B 21/367 382/312 |
| 2006/0274170 | A1* | 12/2006 | Azuma | H04N 5/23238 348/246 |
| 2007/0165931 | A1* | 7/2007 | Higaki | G06K 9/00201 382/128 |
| 2010/0296727 | A1* | 11/2010 | Stern | G02B 21/16 382/154 |
| 2012/0019793 | A1* | 1/2012 | Park | G03F 7/70291 355/53 |
| 2012/0321166 | A1* | 12/2012 | Kitamura | A61B 3/0058 382/131 |
| 2013/0135445 | A1* | 5/2013 | Dahi | H04N 13/204 348/47 |
| 2013/0336583 | A1* | 12/2013 | Ernst | G06T 7/80 382/165 |
| 2014/0037142 | A1 | 2/2014 | Bhanu | |
| 2014/0132707 | A1* | 5/2014 | Hashimoto | G06T 7/593 348/36 |
| 2014/0185927 | A1* | 7/2014 | Kawabata | G06T 7/90 382/162 |
| 2014/0320810 | A1* | 10/2014 | Fukuma | A61B 3/102 351/206 |
| 2015/0055085 | A1* | 2/2015 | Fonte | G06F 30/00 351/178 |
| 2015/0219758 | A1* | 8/2015 | Gammenthaler | G08G 1/04 382/103 |
| 2016/0035072 | A1* | 2/2016 | Qian | G06F 3/1446 382/164 |
| 2020/0027234 | A1 | 1/2020 | Kasahara | |

FOREIGN PATENT DOCUMENTS

| | | |
|---|---|---|
| JP | 7-182520 | 7/1995 |
| JP | 7-260809 | 10/1995 |
| JP | 8-80840 | 3/1996 |
| JP | 10-096626 | 4/1998 |
| JP | 2005-161988 | 6/2005 |
| JP | 2007-072665 | 3/2007 |
| JP | 2007-148788 | 6/2007 |
| JP | 2011-048116 | 3/2011 |
| JP | 2013-232241 | 11/2013 |
| JP | 6004216 | 10/2016 |
| WO | 2012/125687 | 9/2012 |

OTHER PUBLICATIONS

Written Opinion issued in PCT/JP2017/035086, translation, dated Feb. 14, 2017, pp. 1-4.
International Search Report issued in PCT/JP2016/086145, dated Feb. 14, 2017, pp. 1-4.
Written Opinion issued in PCT/JP2016/086145, dated Feb. 14, 2017, pp. 1-4.

\* cited by examiner

POSITION-INFORMATION SPECIFYING METHOD, POSITION-INFORMATION SPECIFYING DEVICE, AND POSITION-INFORMATION SPECIFYING PROGRAM

TECHNICAL FIELD OF THE INVENTION

The present invention relates to a position-information specifying method, a position-information specifying device, and a position-information specifying program for accurately specifying a position and a velocity of a photographed object.

PRIOR ART

Conventionally, when a traffic accident is photographed by a security camera set up on a street or a drive recorder mounted in a vehicle, the velocity of the vehicle at the moment of the accident is specified as below.

For example, it is assumed that the traffic accident takes place immediately after the vehicle has passed over a crosswalk. First, two momentary image frames; one is an image at the moment when the head of the vehicle has reached the crosswalk, and the other is an image at the moment when the head of the vehicle has passed over the crosswalk, are selected by eye. Then, the velocity of the vehicle is specified by dividing the length of the crosswalk by the time difference between these two image frames.

SUMMARY OF INVENTION

Problem to be Solved by the Invention

In most cases, however, the accident spot is apart from the drive recorder by 10 m or more, while the drive recorder is mounted in the vehicle at the position of 110 to 130 cm high from the ground. Considering the above, 1 mm on the image can actually correspond to dozens of centimeters to several meters.

Accordingly, even if the moment when the head of the vehicle has reached the crosswalk is determined by eye, the moment can be widely different from the real accident moment. Therefore, the velocity of the vehicle calculated in the above way cannot be accurate, and the blame percentage in the accident would also be calculated incorrectly.

Due to the characteristics of the camera and the lens, the image photographed by the drive recorder is distorted in accordance with deviation from the center of the image. Therefore, the positional error of the vehicle in the accident would also be larger, according to the deviation.

Moreover, in most cases, the vehicle is decelerated by the brake, immediately before the accident. However, in the above way, only the average velocity of the moment when the head of the vehicle has reached the crosswalk and the moment when the head of the vehicle has passed over the crosswalk is specified. Thus, the velocity in each image frame or the velocity at the crush moment is not specified.

In view of the foregoing, it is an object of the invention to provide a position-information specifying method, a position-information specifying device, and a position-information specifying program for accurately specifying a position and a velocity of a photographed object.

Means for Solving the Problem

The present invention provides a position-information specifying method including: a step for obtaining an object image photographed by a first photographing means having a predetermined distortion characteristic, a predetermined distortion being caused on the object image due to the predetermined distortion characteristic; a step for obtaining a first scale plate image corresponding to an image obtained when a first scale plate, which has a first scale and is arranged so as to be opposed to a second photographing means having the predetermined distortion characteristic at a first distance, is photographed by the second photographing means; a step for overlapping the first scale plate image and the object image with each other; a step for measuring an image-size of a first reference object, which is appeared on the object image and has a first predetermined size, by using the first scale of the first scale plate image; and a step for calculating a first target distance between the first photographing means and the first reference object, based on the image-size of the first reference object, the first predetermined size, and the first distance.

With this configuration, the image-size of the first reference object whose distortion is corrected, is obtained by using the first scale plate image corresponding to the distortion characteristic. Therefore, the first target distance between the first photographing means and the first reference object 5 can be accurately calculated, based on the image-size of the first reference object whose distortion is corrected, the first predetermined size, and the first distance.

It is preferable that the position-information specifying method further includes: a step for calculating two first target distances between the first photographing means and the first reference object with respect to two object images photographed at a predetermined time span; and a step for calculating a velocity of the first reference object by dividing a difference between the two first target distances by the predetermined time span.

With this configuration, the instantaneous velocity of the first reference object can also be accurately calculated.

It is preferable that the position-information specifying method further includes: a step for measuring an image-size of a second reference object, which is appeared on the object image and is an immovable object having a second predetermined size, by using the first scale of the first scale plate image; a step for calculating a second target distance between the first photographing means and the second reference object, based on the image-size of the second reference object, the second predetermined size, and the first distance; a step for calculating a velocity of the first photographing means by dividing, by a predetermined time span, a difference between the two second target distances with respect to two object images photographed at the predetermined time span; and a step for calculating an absolute velocity of the first reference object by subtracting the velocity of the first photographing means from the velocity of the first reference object.

With this configuration, the changes of the position and the velocity of the first photographing means are taken into account when the object image is photographed by the first photographing means, which is moving. Therefore, the instantaneous velocity of the first reference object can be accurately calculated, even when video images photographed by the drive recorder mounted in the moving vehicle is employed.

It is preferable that the position-information specifying method further includes: a step for arranging a second scale plate having a second scale so as to be opposed to the first scale plate at a second distance apart from the first scale plate; a step for obtaining a second scale plate image which is obtained when the first scale plate and the second scale plate are photographed by the second photographing means; and a step for calculating the first distance, based on the first scale on the second scale plate image, the second scale on the second scale plate image, and the second distance.

With this configuration, the first distance is calculated after the first scale plate is arranged in an arbitrary position, considering the possibility that the first scale plate cannot be arranged properly at the designated place. In this way, even when the windshield would be a hindrance, the first distance can be accurately calculated. As the result, the target distance can also be accurately calculated.

It is preferable that the first photographing means is used as the second photographing means.

With this configuration, it becomes unnecessary to prepare the second photographing means having a same condition, such as type and mounted position, as the first photographing means.

It is preferable that the position-information specifying method further includes a step for calculating a horizontal distance between the first photographing means and the first reference object, based on a difference between a height of the first photographing means and a height of the first reference object, and the calculated first target distance.

With this configuration, it becomes possible to calculate the horizontal distance between the first photographing means and the first reference object.

It is preferable that the position-information specifying method further includes a step for calculating at least one of a driving tendency of a driver of the vehicle and performance change information of the vehicle, based on the calculated first target distance, when the first photographing means is mounted on the vehicle.

With this configuration, allowing drivers to access their own driving tendency or the performance change information can help to improve the road safety. Furthermore, if the drivers are graded based on the driving tendency, it can help to estimate the price of an insurance premium for vehicle damage and the like.

Another aspect of the present invention provides a position-information specifying device including: a storing unit configured to store an object image photographed by a first photographing means having a predetermined distortion characteristic, a predetermined distortion being caused on the object image due to the predetermined distortion characteristic; a first scale plate image corresponding to an image obtained when a first scale plate, which has a first scale and is arranged so as to be opposed to a second photographing means having the predetermined distortion characteristic at a first distance, is photographed by the second photographing means; and first reference object information with respect to a first reference object having a first predetermined size; an overlapping unit configured to overlap the first scale plate image and the object image with each other; a specifying unit configured to specify the first reference object, which is appeared on the object image, while referring to the first reference object information; a measuring unit configured to measure an image-size of the specified first reference object by using the first scale of the first scale plate image; and a calculating unit configured to calculate a first target distance between the first photographing means and the first reference object, based on the image-size of the first reference object, the first predetermined size, and the first distance.

It is preferable that the calculating unit calculates two first target distances between the first photographing means and the first reference object with respect to two object images photographed at a predetermined time span; and calculates a velocity of the first reference object by dividing a difference between the two first target distances by the predetermined time span.

It is preferable that the storing unit further stores second reference object information with respect to a second reference object, which is an immovable object having a second predetermined size. The specifying unit specifies the second reference object, which is appeared on the object image, while referring to the second reference object information. The measuring unit measures an image-size of the specified second reference object by using the first scale of the first scale plate image. The calculating unit calculates a second target distance between the first photographing means and the second reference object, based on the image-size of the second reference object, the second predetermined size, and the first distance. The calculating unit calculates a velocity of the first photographing means by dividing, by the predetermined time span, a difference between two second target distances with respect to two object images photographed at the predetermined time span. The calculating unit calculates an absolute velocity of the first reference object by subtracting the velocity of the first photographing means from the velocity of the first reference object.

It is preferable that the position-information specifying device further includes a step for calculating a horizontal distance between the first photographing means and the first reference object, based on a difference between a height of the first photographing means and a height of the first reference object, and the calculated first target distance.

It is preferable that the position-information specifying device further includes a step for calculating at least one of a driving tendency of a driver of the vehicle and performance change information of the vehicle, based on the calculated first target distance, when the first photographing means is mounted on the vehicle.

Another aspect of the present invention provides a position-information specifying program installed on a computer storing an object image photographed by a first photographing means having a predetermined distortion characteristic, a predetermined distortion being caused on the object image due to the predetermined distortion characteristic; a first scale plate image corresponding to an image obtained when a first scale plate, which has a first scale and is arranged so as to be opposed to a second photographing means having the predetermined distortion characteristic at a first distance, is photographed by the second photographing means; and first reference object information with respect to a first reference object having a first predetermined size. The program includes: a step for overlapping the first scale plate image and the object image with each other; a step for specifying the first reference object, which is appeared on the object image, while referring to the first reference object information; a step for measuring an image-size of the specified first reference object by using the first scale of the first scale plate image; and a step for calculating a first target distance between the first photographing means and the first reference object, based on the image-size of the first reference object, the first predetermined size, and the first distance.

It is preferable that the calculating step calculates two first target distances between the first photographing means and the first reference object with respect to two object images photographed at a predetermined time span; and calculates a velocity of the first reference object by dividing a difference between the two first target distances by the predetermined time span.

It is preferable that the computer further stores second reference object information with respect to a second reference object, which is an immovable object having a second predetermined size. The specifying step specifies the second reference object, which is appeared on the object image, while referring to the second reference object information. The measuring step measures an image-size of the specified second reference object by using the first scale of the first scale plate image. The calculating step calculates a second target distance between the first photographing means and the second reference object, based on the image-size of the second reference object, the second predetermined size, and the first distance. The calculating step calculates a velocity of the first photographing means by dividing, a predetermined time span, a difference between two second target distances with respect to two object images photographed at the predetermined time span. The calculating step calculates an absolute velocity of the first reference object by subtracting the velocity of the first photographing means from the velocity of the first reference object.

It is preferable that the position-information specifying program further includes a step for calculating a horizontal distance between the first photographing means and the first reference object, based on a difference between a height of the first photographing means and a height of the first reference object, and the calculated first target distance.

It is preferable that the position-information specifying program further includes a step for calculating at least one of a driving tendency of a driver of the vehicle and performance change information of the vehicle, based on the calculated first target distance, when the first photographing means is mounted on the vehicle.

Effects of the Invention

The position-information specifying method, the position-information specifying device, and the position-information specifying program are capable of accurately specifying a position and a velocity of a photographed object.

PREFERRED EMBODIMENTS

A position-information specifying method according to a first embodiment of the present invention will be described below while referring to FIG. 1 to FIG. 5.

In this embodiment, the position and the velocity of an oncoming vehicle 1 are specified, assuming that the image of the oncoming vehicle 1 is photographed by a monitor camera 2, such as a drive recorder mounted in a vehicle 10 which is stopped.

Hereinafter, a method (position-information specifying method) for measuring the position and the velocity of the oncoming vehicle 1 according to this embodiment is described, while referring to the flowchart of FIG. 1.

Figure 2A:
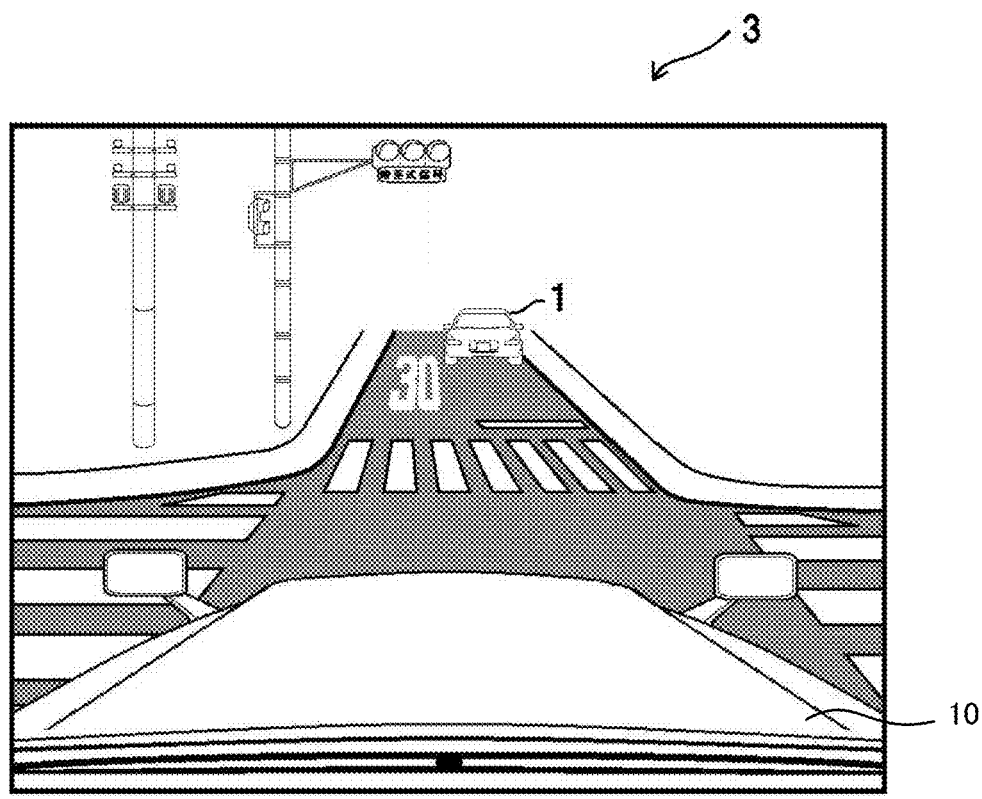
FIG. 2(a) is an explanatory drawing of a plurality of object images according to the first embodiment of the present invention.
Figure 2B:
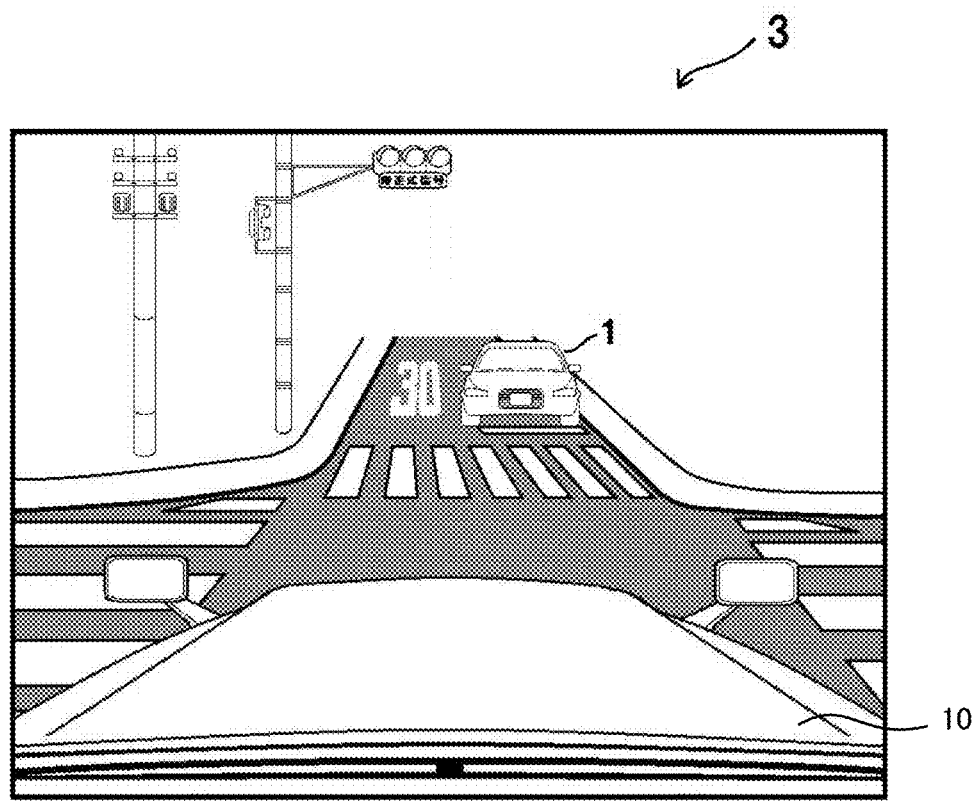
FIG. 2(b) is an explanatory drawing of the plurality of object images according to the first embodiment of the present invention.
Figure 2C:
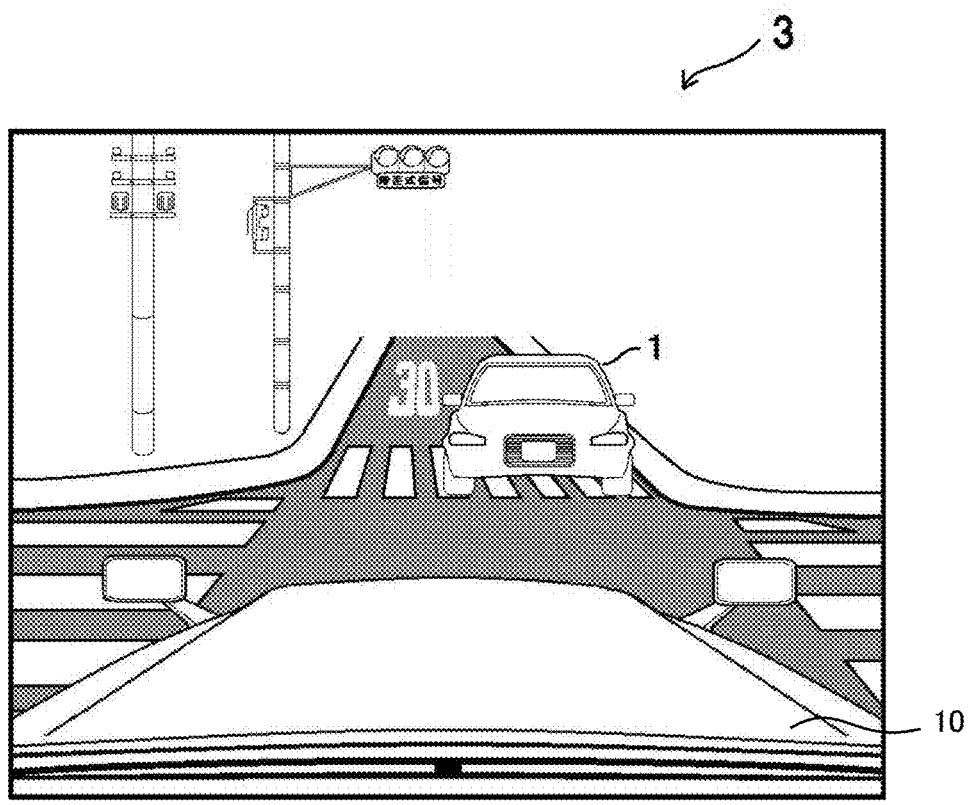
FIG. 2(c) is an explanatory drawing of the plurality of object images according to the first embodiment of the present invention.

First, a plurality of object images 3 (FIG. 2(a) to FIG. 2(c)), which is photographed by the monitor camera 2 at a predetermined time span, is obtained (S11).

In this embodiment, a plurality of image frames making up a video image photographed by the monitor camera 2 is obtained as the plurality of object images 3. These images include a predetermined distortion due to the distortion characteristic of the monitor camera 2. In this embodiment, the distortion is assumed to be larger in accordance with the deviation from the center of the image.

This monitor camera 2 corresponds to the "first photographing means" and the "second photographing means" of the present invention.

Figure 3:
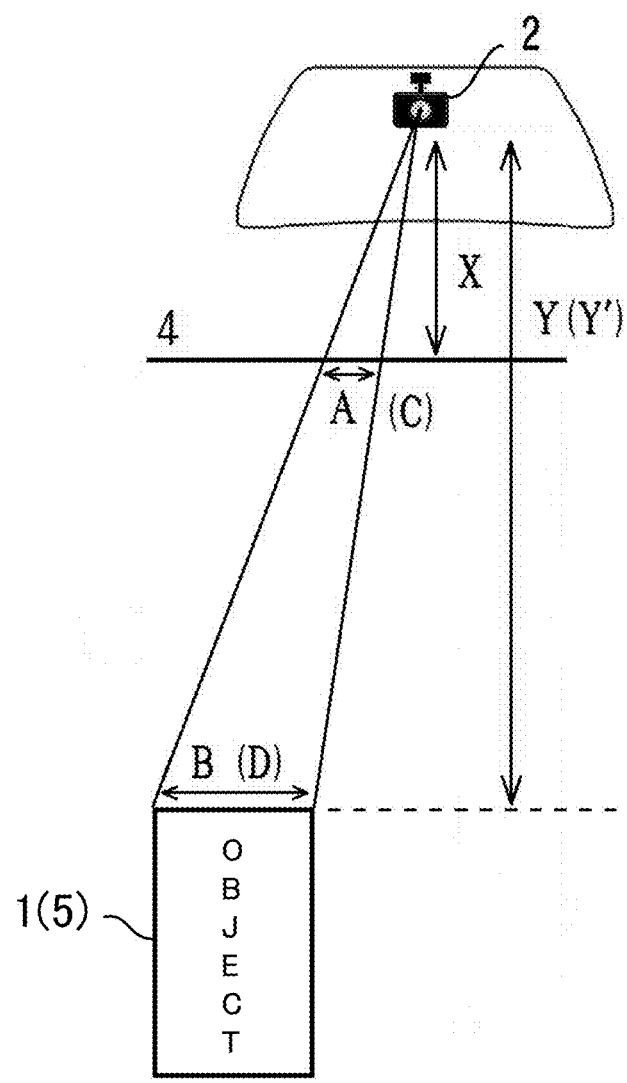
FIG. 3 is an explanatory drawing of calculation of a first target distance according to the first embodiment of the present invention.
Figure 4A:
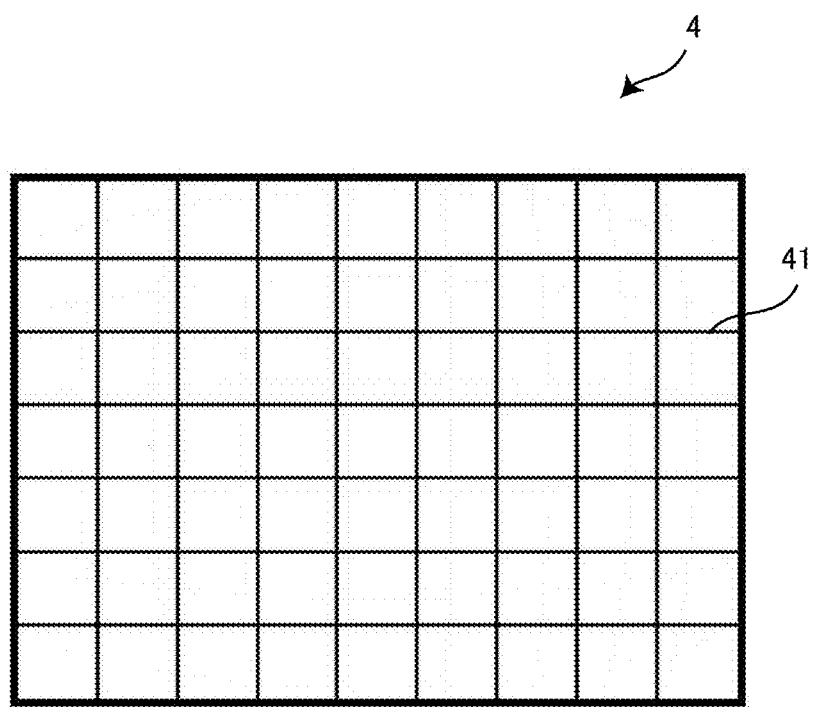
FIG. 4(a) is a plan view of a first scale plate according to the first embodiment of the present invention.

Next, as shown in FIG. 3, a first scale plate 4 is arranged so as to be opposed to the monitor camera 2 at a first distance X (S12). The monitor camera 2 can be prepared by using the vehicle 10. Otherwise, a monitor camera same as the monitor camera 2 may be prepared. Then, the arrangement of the first scale plate 4 can be performed in an arbitrary place. As shown in FIG. 4 (a), a first scale 41 having predetermined intervals of square grids are formed on the first scale plate 4.

Figure 4B:
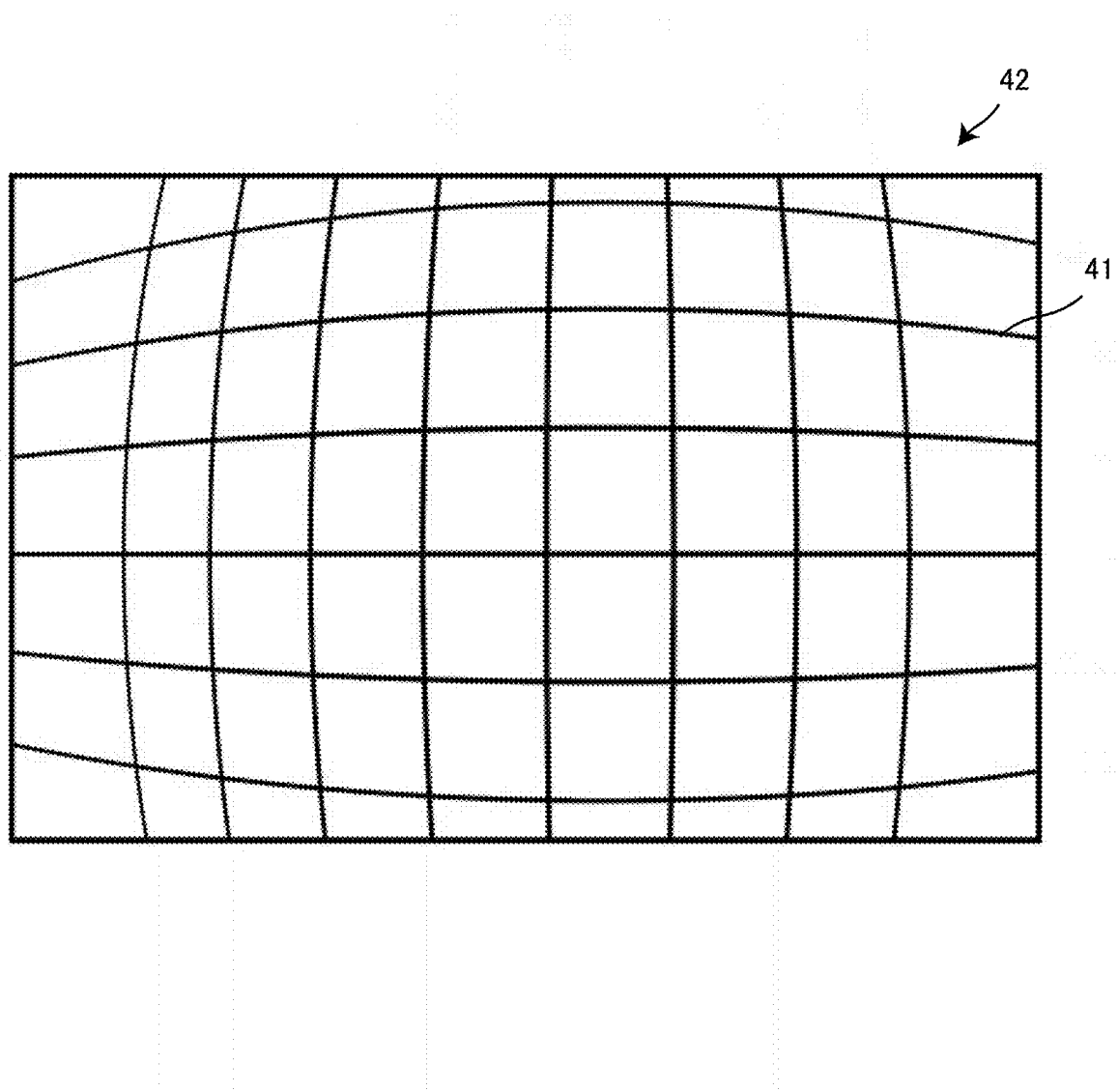
FIG. 4(b) is a plan view of a first scale plate image according to the first embodiment of the present invention.

Next, a first scale plate image 42 shown in FIG. 4 (b) is obtained by photographing the first scale plate 4 with the monitor camera 2 (S13). The first scale plate image 42 is the image photographed by the monitor camera 2 having the distortion characteristic. Therefore, the first scale plate image 42 is displayed with the distortion, and the intervals of square grids become uneven, as shown in FIG. 4(b). However, the intervals of the square grids can be considered uniform when calculation is performed.

Figure 5:
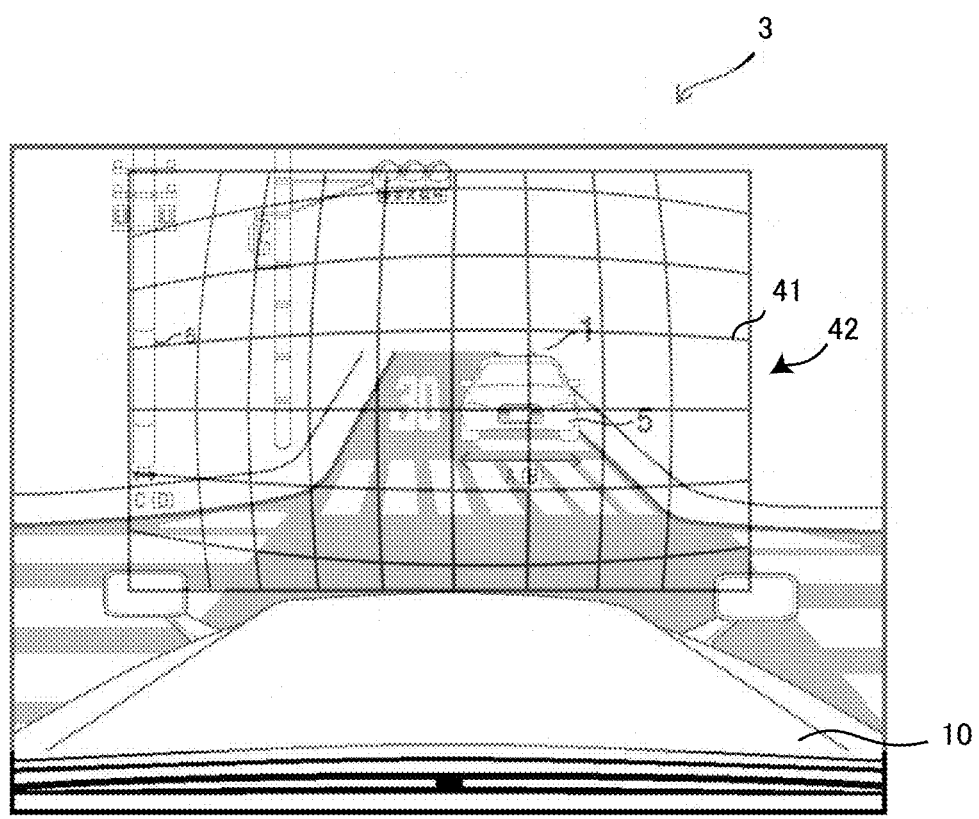
FIG. 5 is an explanatory drawing of overlapping the first scale plate image and the object image with each other, according to the first embodiment of the present invention.

Next, as shown in FIG. 5, the first scale plate image 42 and one object images 3 are overlapped with each other (S14).

In this embodiment, the data of the first scale plate image 42 and the data of the object image 3 are overlapped with each other. However, the first scale plate image 42 and the object image 3 which are printed on paper or sheet like material may be overlapped. In this case, either the first scale 41 or the object image 3 needs to be permeable, in order for both of the first scale 41 and the object image 3 to be recognized at the same time.

Next, an image-size A of a first reference object 5, which is appeared on the object image 3, is measured, by using the first scale 41 of the first scale plate image 42 (S15).

The first reference object 5 has a first predetermined size B and is fixed to the oncoming vehicle 1. As long as fixed to the oncoming vehicle 1, any object such as a license plate and vehicle mirrors can be employed as the first reference object 5. The width of the oncoming vehicle 1 can also be employed as the first reference object 5. This is because the license plates has the size common to all vehicles, and the width of the oncoming vehicle 1 and the size of vehicle mirrors are designed in accordance with the type of the vehicle. In FIG. 3 and FIG. 5, the width of the oncoming vehicle 1 is employed as the first predetermined size B.

In FIG. 5, considering the visibility of the figure, the object image 3 is drawn undistorted. However, the object image 3 is, in reality, distorted as well as the first scale 41.

The interval of the first scale 41 can be considered uniform, even though the first scale 41 appears to be distorted. Accordingly, the image-size A of the first reference object 5 can be measured by reading the first scale 41 corresponding to the width of the first reference object 5. In FIG. 5, considering the visibility of the figure, the first scale 41 has fewer scales. In reality, however, it is preferable that the first scale 41 is much finer scales.

Finally, a first target distance Y between the monitor camera 2 and the first reference object 5 is calculated, based on the image-size A of the first reference object 5, the first predetermined size B, and the first distance X (S16).

To be more specific, as shown in FIG. 3, the formula (X:Y=A:B) is satisfied. Therefore, the first target distance Y can be calculated by substituting, into this formula, the first distance X which is preset, the measured image-size A of the first reference object 5, and the first predetermined size B.

The instantaneous velocity of the first reference object 5 can be calculated as follows. S14 to S16 are performed for two successive object images 3 which are also obtained in S11. Then, the difference between the two first target distances Y, which are obtained from the two successive object images 3, is calculated. Then, the difference is divided by a predetermined time span which is a shot span.

As described above, in the position-information specifying method according to this embodiment, the image-size A of the first reference object 5 whose distortion is corrected, is obtained by using the first scale plate image 42 corresponding to the distortion characteristic. Therefore, the first target distance Y between the monitor camera 2 and the first reference object 5 can be accurately calculated, based on the image-size A of the first reference object 5 whose distortion is corrected, the first predetermined size B, and the first distance X.

In addition, the instantaneous velocity of the first reference object 5 can also be accurately calculated by dividing the difference between the two first target distances Y, which are obtained from the two successive object images 3 by the predetermined time span which is a shot span.

Next, a position-information specifying method according to a second embodiment of the present invention is explained, while referring to FIG. 3 and FIG. 5 to FIG. 7.

FIG. 3 and FIG. 5, which are referred to in the first embodiment, are commonly used herein.

In the first embodiment, the position and the velocity of the first reference object 5 is specified by using the object image 3 photographed by the monitor camera 2 mounted in the vehicle 10 which is stopped. In this embodiment, however, the position and the velocity of the first reference object 5 is specified by using the object image 3 photographed by the monitor camera 2 mounted in the vehicle 10 which is moving.

When the vehicle 10 is moving, the monitor camera 2 mounted in the moving vehicle 10 is also moving. Therefore, the change of the position and the velocity of the monitor camera 2 should be taken into account when specifying the position and the velocity of the first reference object 5.

Figure 6:
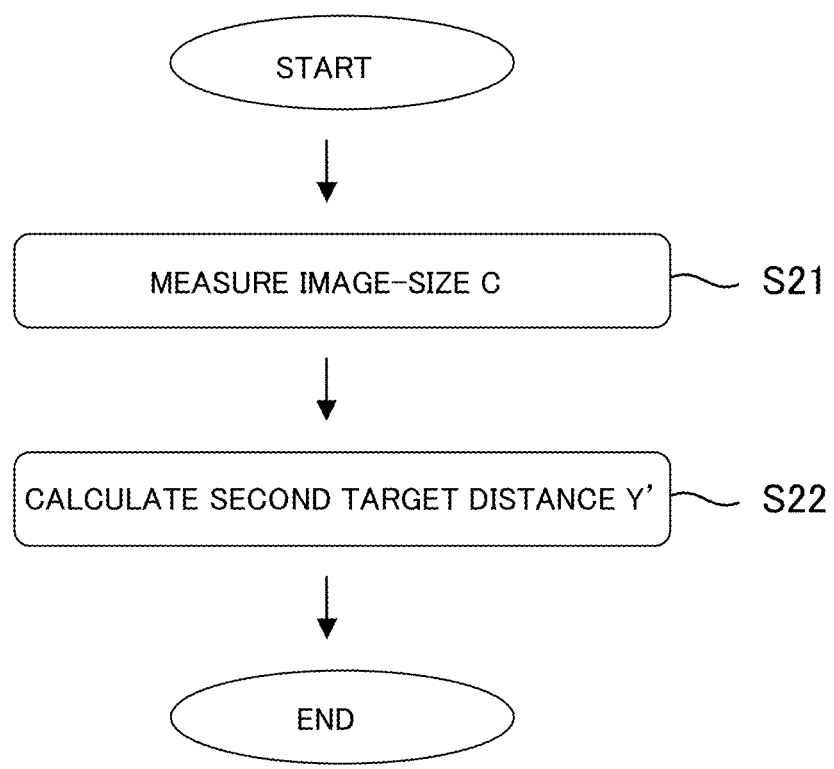
FIG. 6 is a flowchart of a position-information specifying method according to a second embodiment of the present invention.

FIG. 6 is a flowchart of the position-information specifying method according to this embodiment. The process shown in FIG. 6 is performed after S14 of FIG. 1.

First, after the first scale plate image 42 and the object image 3 are overlapped with each other in S14, an image-size C of a second reference object 6, which is appeared in the object image 3, is measured by using the first scale 41 of the first scale plate image 42 (S21).

Figure 7:
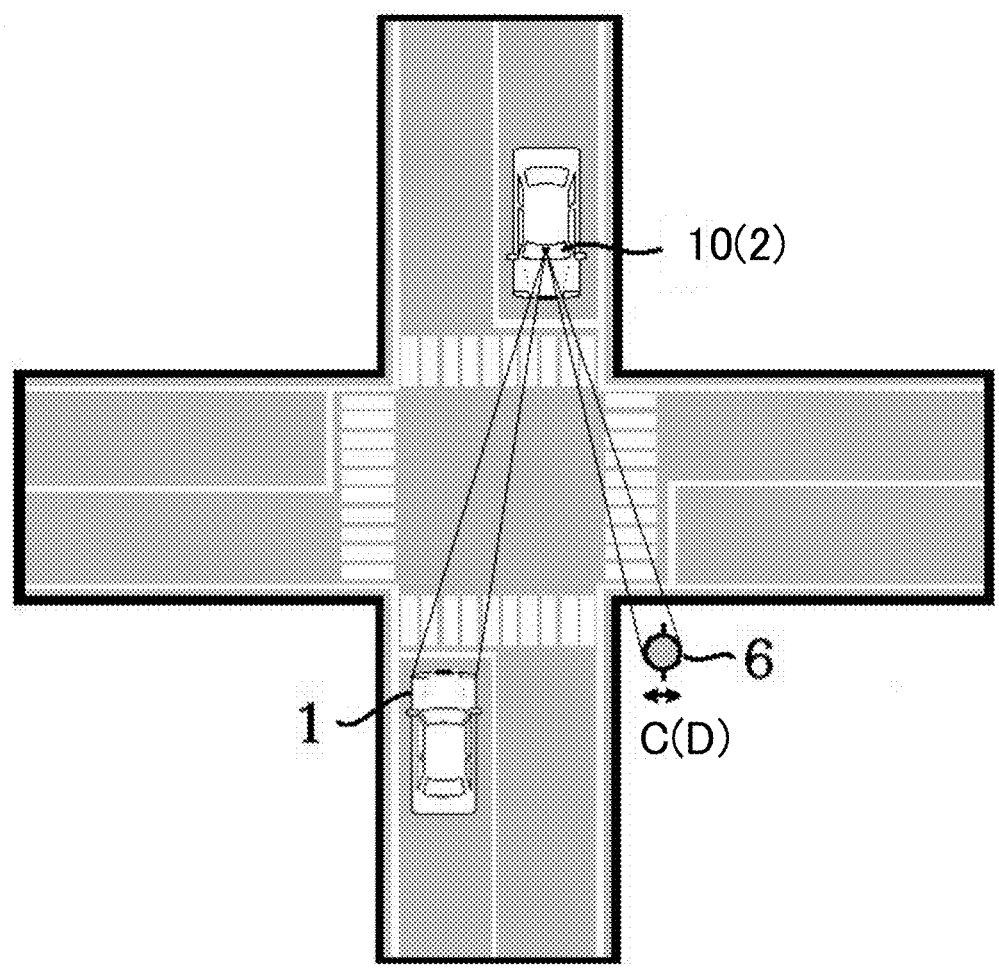
FIG. 7 is an explanatory drawing of the position-information specifying method according to the second embodiment of the present invention.

An immovable object, which is appeared in the object image 3 and has a second predetermined size D, is employed as the second reference object 6. As the second reference object 6, for example, a utility pole or a crosswalk may be employed. A movable object such as a vehicle may be considered as the "immovable object", as long as the object is in a state of stopping. FIG. 5 and FIG. 7 exemplify the case that the diameter of the utility pole is employed as the second predetermined size D.

In the final step, a second target distance Y' between the monitor camera 2 and the second reference object 6 is calculated, based on the image-size C of the second reference object 6, the second predetermined size D, and the first distance X (S22).

To be more specific, as shown in FIG. 3, the formula (X:Y'=C:D) is satisfied. Therefore, the second target distance Y' is calculated by substituting, into the above formula, the first distance X which is preset, the measured image-size C of the second reference object 6, and the second predetermined size D.

The instantaneous velocity of the monitor camera 2 can be calculated as follows. S21 to S22 are performed for two successive object images 3 which are also obtained in S11. Then, the difference between the two second target distances Y', which are obtained from the two successive object images 3, is calculated. Then, the difference is divided by a predetermined time span which is a shot span.

Then, the absolute velocity of the first reference object between the two object images 3 can be calculated by subtracting the velocity of the monitor camera 2, which is calculated from the two successive object images 3, from the velocity of the first reference object 5, which is also calculated from the two successive object images 3.

As described above, in the position-information specifying method according to this embodiment, the changes of the position and the velocity of the monitor camera 2 are taken into account when the object image 3 is photographed by the monitor camera 2, which is moving. Therefore, the instantaneous velocity of the first reference object 5 can be accurately calculated, even when video images photographed by the drive recorder mounted in the moving vehicle is employed.

Figure 8:
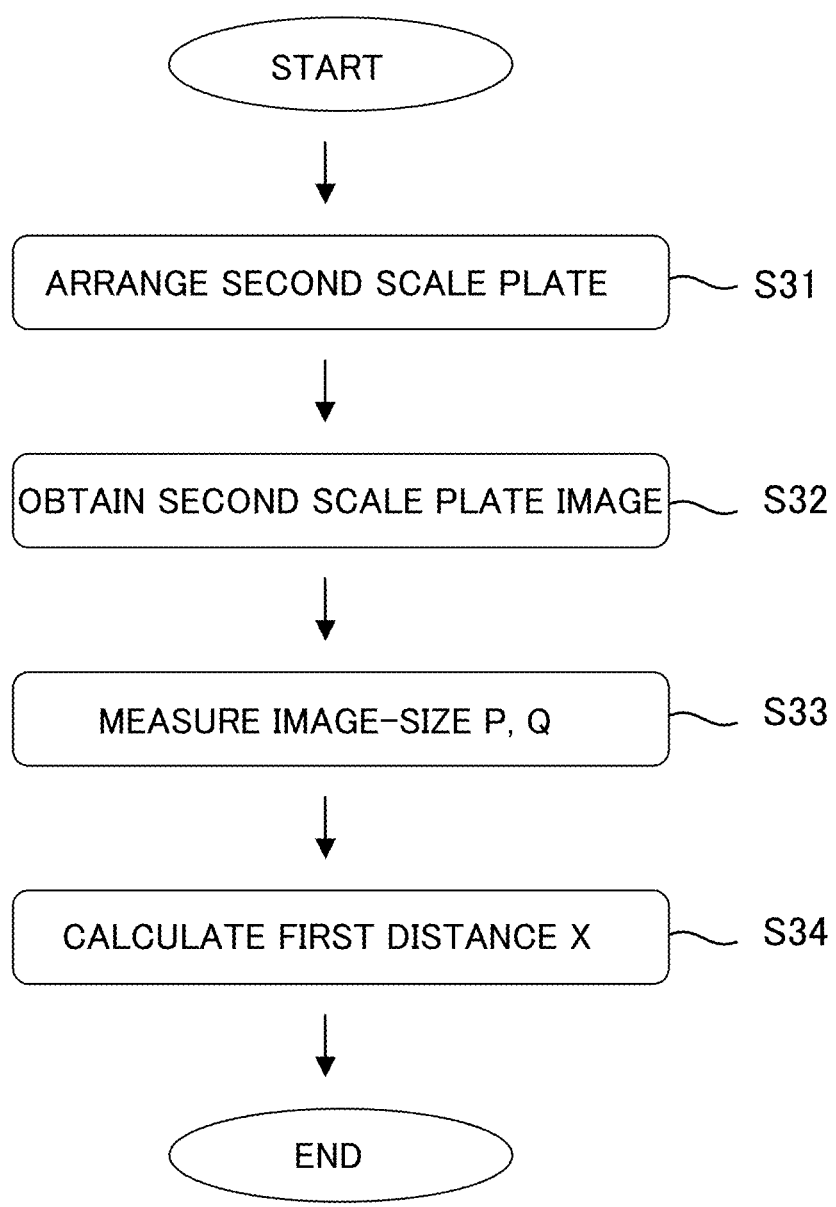
FIG. 8 is a flowchart of a way to calculate a first distance, according to a third embodiment of the present invention.
Figure 9:
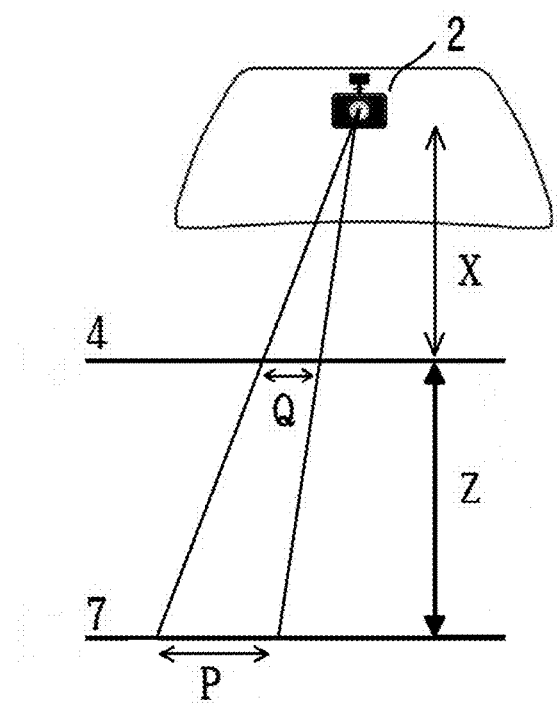
FIG. 9 is an explanatory drawing of calculation of the first distance, according to the third embodiment of the present invention.
Figure 10:
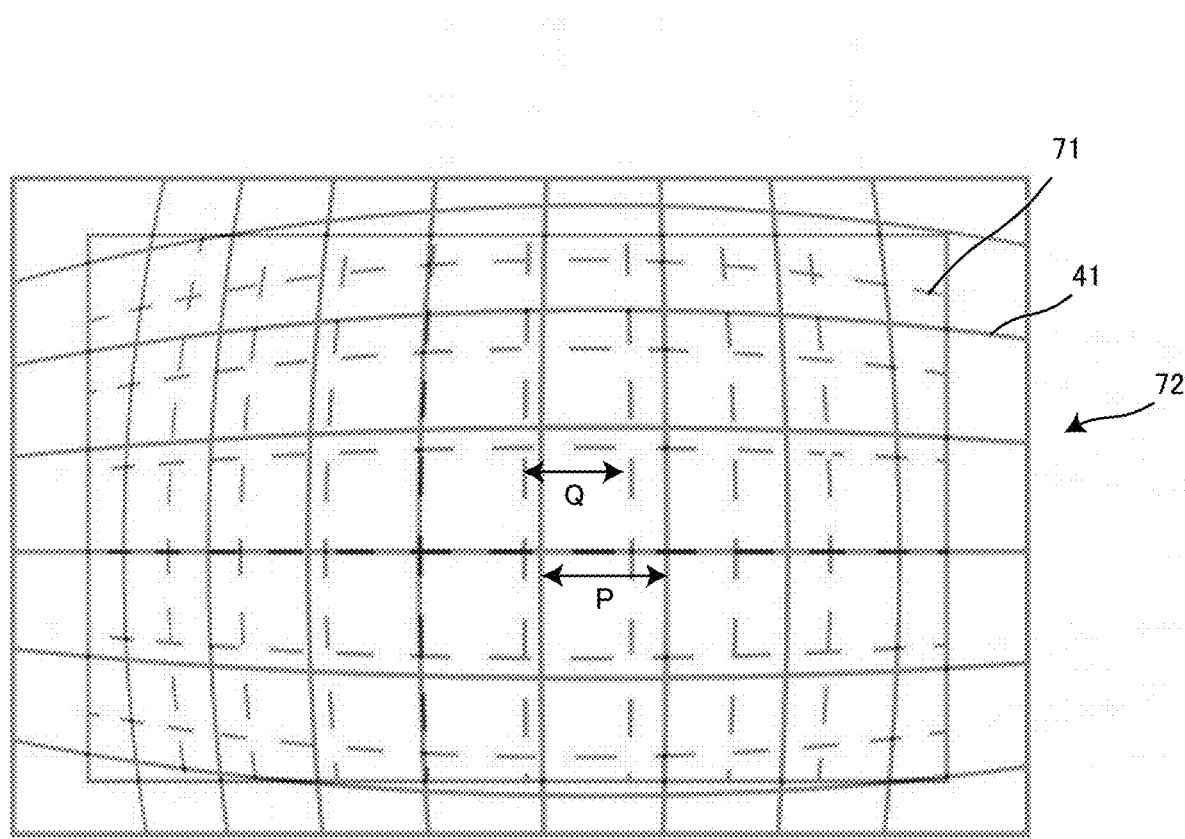
FIG. 10 is a plan view of a second scale plate image according to the third embodiment of the present invention.

Next, a position-information specifying method according to a third embodiment of the present invention is described, while referring to FIG. 8 to FIG. 10.

When the monitor camera 2 mounted in the vehicle 10 is used to specify the position-information, it is difficult to arrange the first scale plate 4 exactly at the first distance X apart from the monitor camera 2, since the windshield would be a hindrance.

Then, in this embodiment, considering the possibility that the first scale plate 4 cannot be arranged properly at the designated place, the first distance X is calculated, after the first scale plate 4 is arranged in an arbitrary position.

FIG. 8 is a flowchart of a way to calculate the first distance X, according to this embodiment. The process shown in FIG. 8 should be completed before S16 in FIG. 1.

First, a second scale plate 7 is arranged so as to be opposed to the first scale plate 4 at a second distance Z, as shown in FIG. 9 (S31). A second scale 71 is formed on the second scale plate 7 at the same predetermined intervals of square grids as the first scale 41 of the first scale plate 4.

In this embodiment, the monitor camera 2, the first scale plate 4, and the second scale plate 7 are arranged in this order. However, the order of the first scale plate 4 and the second scale plate 7 can be switched.

Next, a second scale plate image 72 shown in FIG. 10 is obtained by photographing the first scale plate 4 and the second scale plate 7 with the monitor camera 2 (S32).

Though the first scale 41 and the second scale 71 have the same size actually, the image of the second scale 71 is taken smaller than that of the first scale 41, as shown in FIG. 10. This is because the second scale plate 7 is placed farther away from the monitor camera 2, comparing to the first scale plate 4. Therefore, the second scale 71 is preferably made distinguishable from the first scale 41 by a dotted line or coloring, as shown in FIG. 10.

Next, an image-size P of the first scale 41 and an image-size Q of the second scale 71 of the second scale plate image 72 are measured (S33).

Finally, the first distance X is calculated based on the image-size P of the first scale 41, the image-size Q of the second scale 71 and the second distance Z (S34).

To be more specific, as in FIG. 9, the formula (X:X+Z=Q:P) is satisfied. Therefore, the first distance X is calculated by substituting, into this formula, the second distance Z which is preset, the measured image-size P of the first scale 41, and the measured image-size Q of the second scale 71.

As described above, in the position-information specifying method according to this embodiment, the first distance X is calculated after the first scale plate 4 is arranged in an arbitrary position, considering the possibility that the first scale plate 4 cannot be arranged properly at the designated place. In this way, even when the windshield would be a hindrance, the first distance X can be accurately calculated. As the result, the target distance Y can also be accurately calculated.

Figure 11:
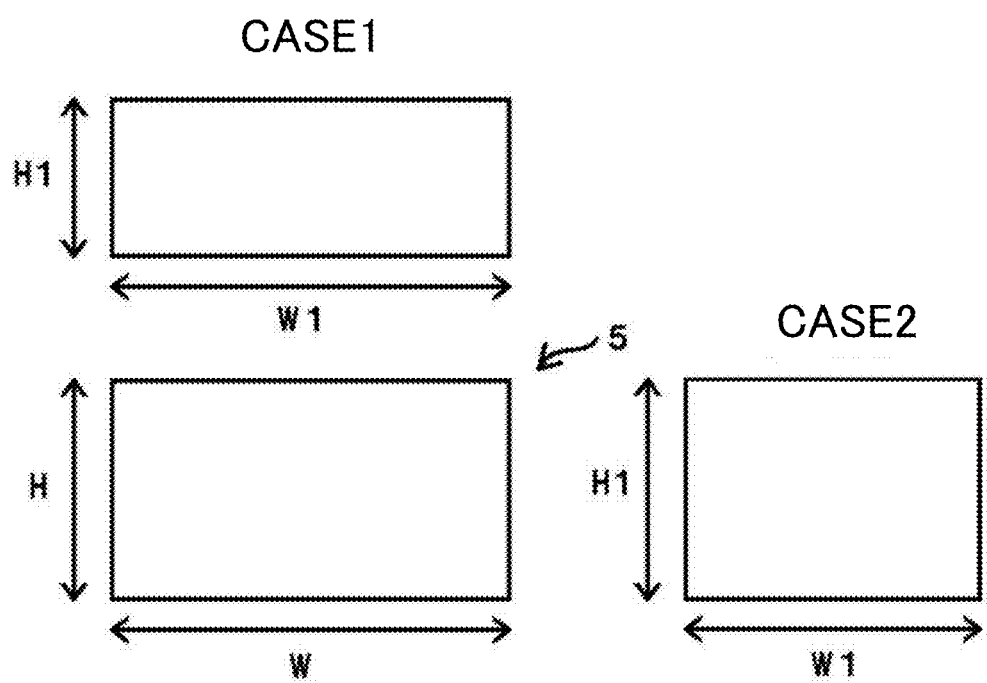
FIG. 11 is an explanatory drawing of a position-information specifying method according to a fourth embodiment of the present invention.

Next, a position-information specifying method according to a fourth embodiment of the present invention is described, while referring to FIG. 11.

In the first and the second embodiments, the case that the monitor camera 2 and the first reference object 5 are facing each other are described. However, the monitor camera 2 and the first reference object 5 are not always facing each other. In such a case, the measured image-size of the first reference object 5 should be converted to the image-size A, which is to be obtained when the first reference object 5 and the monitor camera 2 are facing each other. Below, converting of the image-size in the case that the monitor camera 2 and the first reference object 5 are not facing each other will be described.

In this embodiment, a rectangular-shaped license plate having a predetermined height H and a predetermined width W as in FIG. 11 is employed as the first reference object 5; and its width W is employed as predetermined size B.

When the monitor camera 2 and the first reference object 5 are not facing each other, there are two possible cases; First (Case 1), the first reference object 5 would be inclined to the monitor camera 2 due to the rotation around the horizontal axis; Second (Case 2), the first reference object 5 would be inclined to the monitor camera 2 due to the rotation around the vertical axis.

In these cases, first, the height H1 of the first reference object 5 on the first scale plate image 42 and the width W1 of the first reference object 5 on the first scale plate image 42 are measured, and then, the value of H1/H and the value of W1/W are compared with each other.

When the relation H1/H>W1/W is satisfied, the inclination of the first reference object 5 corresponds to that of the second case (Case 2) described above. Therefore, H1 is equal to the height in the case where the monitor camera 2 and the first reference object 5 are facing each other.

Further, the relation (H1: the width (image-size A) in the case where the monitor camera 2 and the first reference object 5 are facing each other=H: W) is satisfied. Therefore, the image-size A can be calculated, based on H, W, and H1, independently from W1.

In the similar manner, when the relation (H1/H<W1/W (Case 1) is satisfied, the height (image-size A) in the case where the monitor camera 2 and the first reference object 5 are facing each other can be calculated.

The first reference object 5, which is rectangular-shaped, may appear to be distorted in the first scale plate image 42. In such a case, however, when the distorted image of the first reference object 5 is converted to the actual size by using the first scale 41, it can be recognized to be rectangular-shaped.

Figure 12:
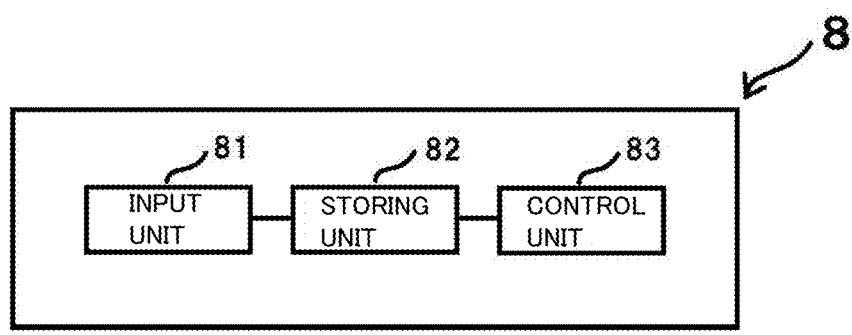
FIG. 12 is a block diagram of a position-information specifying device according to a fifth embodiment of the present invention.
Figure 13:
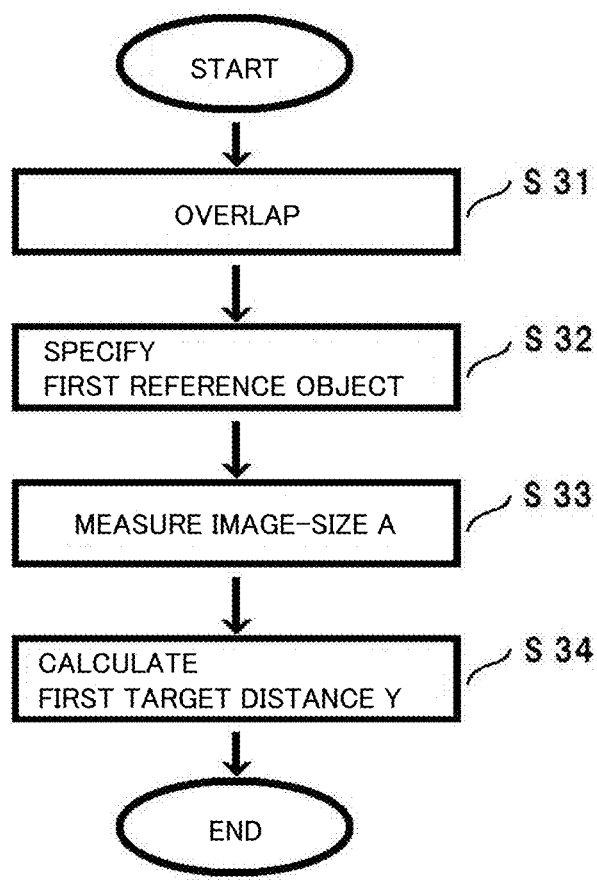
FIG. 13 is a flowchart of the operation of a control unit according to the fifth embodiment of the present invention.

Next, a position-information specifying device 8 according to a fifth embodiment of the present invention is described, while referring to FIG. 12 and FIG. 13.

While the position and the velocity of the oncoming vehicle 1 are specified manually in the above embodiment, the position and the velocity of the oncoming vehicle 1 are specified by using the position-information specifying device 8 in this embodiment. In this embodiment, the position and the velocity of the oncoming vehicle 1 are specified, assuming that the image of the oncoming vehicle 1 is photographed by the monitor camera 2 mounted in the stopped vehicle 10, similarly to the first embodiment. The position-information specifying device 8 is, however, adaptable to the other embodiments of the present invention.

As shown in FIG. 12, the position-information specifying device 8 is provided with an input unit 81, a storing unit 82, and a control unit 83.

From the input unit 81, the first distance X, the object image 3 and the first scale plate image 42 can be entered.

In the storing unit 82, information with respect to the first reference object (e.g. candidates of the first reference object 5, identification information for each first reference object 5 and the first predetermined size B of each first reference object 5) are stored. As the first reference object 5, a license plate, vehicle mirrors, and the oncoming vehicle 1 itself can be employed. As the identifying information with respect to the first reference object 5, information on the color, the shape and the size of the type of vehicle can be employed, or otherwise the information on the color, the shape and the size of the license plate of the vehicle can also be employed. As the first predetermined size B of the first reference object 5, the width of the vehicle or the width of the license plate can be employed.

In the storing unit 82, the first distance X, the object image 3, and the first scale plate image 42, which are entered from the input unit 81, are also stored.

The control unit 83 calculates the target distance Y between the monitor camera 2 and the first reference object 5, based on the information stored in the storing unit 82. The control unit 83 is corresponding to the "overlapping unit", the "specifying unit", the "measuring unit" and the "calculating unit" of the present invention.

Hereinafter the operation of the control unit 83 is described, while the flowchart in FIG. 13 is referred. In the flowchart in FIG. 13, the operation starts when a start button (not shown), which is equipped in the position-information specifying device 8, is pressed, while the first distance X, the object image 3, and the first scale plate image 42 are being stored in the storing unit 82.

First, the control unit 83 overlaps the first scale plate image 42 and the object images 3, which are stored in the storing unit 82, with each other (S31).

Next, the control unit 83 specifies the first reference object 5, which is appeared on the object image 3, while referring to the information with respect to the first reference object stored in the storing unit 82 (S32).

To be more specific, the control unit 83 determines the portion having little or no difference in the coloring or the shading as a single object, and then, obtains the identification information of the object such as the coloring, the shape, and the size by using the first scale plate image 42. Based on the obtained identification information, the control unit 83 specifies, as the first reference object 5, the object having the identification information corresponds to or approximates to the identification information stored in the storing unit 82. For example, when the obtained identification information and the identification information stored in the storing unit 82 are corresponding to each other by 90% or more, the object can be specified as the first reference object 5.

Figure 1:
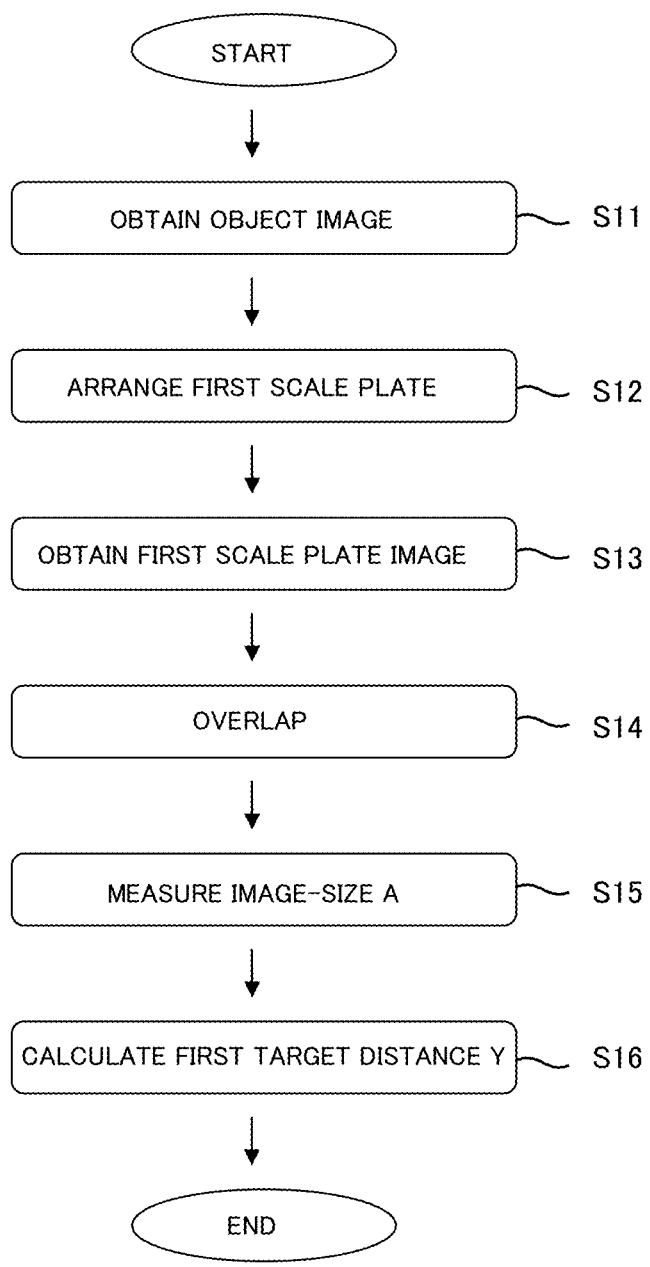
FIG. 1 is a flowchart of a position-information specifying method according to a first embodiment of the present invention.

Next, similar to S15 of FIG. 1, the control unit 83 measures the image-size A of the specified first reference object 5 by using the first scale 41 on the first scale plate image 42 (S33). Then, similar to S16 of FIG. 1, the control unit 83 calculates the first target distance Y between the monitor camera 2 and the first reference object 5, based on the measured image-size A of the first reference object 5, the first predetermined size B stored in the storing unit 82, and the first distance X also stored in the storing unit 82 (S34).

When the object image 3 contains a plurality of first reference objects 5, it is possible to calculate the first target distance Y for each first reference object 5 in order to specify more accurately the information of the oncoming vehicle 1.

Thereafter, similar to the first embodiment, the control unit 83 can calculate the instantaneous velocity of the first reference object 5, by calculating the first target distance Y for each of the two object images 3.

If the information with respect to the second reference object (e.g. candidates of the second reference object 6, identification information for each second reference object 6 and the second predetermined size D of each second reference object 6) is stored in the storing unit 82 in advance, the control unit 83 can specify the second reference object 6, which is appeared in the object image 3. In this way, similar to the second embodiment, the absolute velocity of the first reference object 5 can be calculated even if the vehicle 10 is moving.

As described above, the position-information specifying device 8 of this embodiment can automatically calculate the position and the velocity of the oncoming vehicle 1. It helps to save great amount of time to calculate the position and the velocity of the oncoming vehicle 1, compared to measuring the image-size A by eye.

While the position-information specifying method of the invention has been described in detail with reference to the preferred embodiment thereof, it would be apparent to those skilled in the art that many modifications and variations may be made therein without departing from the spirit of the invention, the scope of which is defined by the attached claims.

For example, in the above embodiments, the gap in the height of the monitor camera 2 and the height of the first reference object 5 is not considered for the sake of easy understanding. However, when the gap in height is taken into account, the calculation becomes more accurate.

The horizontal distance between the monitor camera 2 and the crosswalk can be calculated based on the height of the monitor 2 and the calculated first target distance Y by using Pythagorean theorem. Further, the horizontal distance between the monitor camera 2 and the license plate can be calculated based on the height gap between the monitor camera 2 and the license plate and the calculated first target distance Y by using Pythagorean theorem.

In the above embodiments, as the monitor 2, the drive recorder mounted in the oncoming vehicle 1 is employed. However, security cameras set up on the street or cell phone cameras handed by passenger can also be employed as the monitor camera 2.

In the above embodiments, the case that the monitor camera 2 has the distortion characteristic shown in FIG. 4 (b) is described. However, other type of distortion may also be employed. It is preferable that the distortion characteristic of the first photographing means and the second photographing means are perfectly identical. However, the distortion characteristics may not be perfectly identical. For example, if both the first photographing means and the second photographing means are provided with fish-eye type of lends, the effect of the present invention can be secured. Such a case is also contained in the scope of the present invention. Further, the characteristic which occurs no distortion is also contained in the scope of the present invention. Therefore, the case that no distortion occurs equally in both the first photographing means and the second photographing means is contained in the scope of the present invention.

In the above embodiment, the square grids of the first scale 41 and the square grids of the second scale 71 are provided on the first scale plate 4 and the second scale plate 7 respectively. However, the scale does not necessary form square grids and any mark may be employed, as long as it serves as a mark for measurement. Further, the first scale 41 and the second scale 71 are not necessary equal in size or in type of mark, as long as each of their distance can be recognized.

In the above embodiments, as shown in FIG. 1, the first scale plate 4 is arranged in S12, thereafter the image of the first scale plate 4 is photographed in S13. However, this invention also includes the case that an object corresponding to an image obtained by photographing the first scale plate 4, which is arranged so as to be opposed to the monitor camera at the first distance X, is prepared in advance to be employed as the first scale plate image 42.

In the above embodiments, as an example, the position and the velocity of the oncoming vehicle 1 is measured. However, the subject of the present invention is not limited to this and any object having the first reference object 5 may become the subject to the measurement of the present invention.

In the first embodiment, the position and the velocity of the oncoming vehicle 1 which is moving are specified, based on the object image 3 photographed by the monitor camera 2 mounted in the vehicle 10 which is stopping. However, the position and the velocity of one's own (e.g. the vehicle 10) can be specified based on the object image 3 photographed by the monitor camera 2 mounted in the vehicle 10 which is moving. In this case, the position and the velocity of one's own (e.g. the vehicle 10) can be specified by employing the immovable object (a utility pole, a crosswalk, vehicle which is stopping) as the first reference object.

The instantaneous velocity of the first reference object 5 is calculated by using the two successive object images 3, however, the two object images are not necessary successive.

By using the calculated first target distance Y and the calculated velocity, driving tendency (steering wheel angle, acceleration speed, spacing, driving way or the like) of the driver of the vehicle, in which a drive recorder equivalent to the monitor camera 2 is mounted, can be assessed precisely. In addition, allowing drivers to access such information on their own driving tendency can help to improve the road safety. Furthermore, if the drivers are graded based on the driving tendency, it can help to estimate the price of an insurance premium for vehicle damage and the like.

By using the calculated first target distance Y and the velocity, the information on the performance change (degree of tire wear or engine deterioration) of the vehicle, in which a drive recorder equivalent to the monitor camera 2 is mounted, can be calculated precisely. For example, the degree of tire wear can be calculated from the difference between the velocity of the vehicle calculated in the present invention and the velocity displayed on the vehicle's meter. Therefore, allowing drivers to access such information on their vehicles' performance change can help to improve the road safety.

In most cases, a drive recorder, which is equivalent to the monitor camera 2, is often mounted in a tilted state in a vehicle. The degree of the tilt can be calculated by the way presented in this invention.

To be more specific, the object image 3 photographed by the monitor camera 2 mounted in the vehicle in a not-tilted state, and the object image 3 photographed by the monitor camera 2 mounted in the vehicle in a tilted state are respectively prepared. Then, the first scale plate image 42 is overlapped with each of these object images 3. For each of the overlapped images 3, such position difference as in the top and the bottom of the vehicle's head; the left end and the right end of the vehicle's head; and the left end and the right end of the vehicle's body can be measured by reading the first scale 41 of the first scale plate image 42. From these measurement results, the tilt degree of the monitor camera 2 can be calculated.

The present invention is also applied to a program that conducts the process of the control unit 83, or to a record media accommodating the content of the program. In the case of record media, the program should be installed on the computer. The record media storing the program may be reusable and not one-time use only. As reusable record media, for example, CD-ROM may be employed, but the record media is not limited to this.

DESCRIPTION OF THE REFERENCE NUMBER 1 oncoming vehicle
2 monitor camera
3 object image
4 first scale plate
5 first reference object
6 second reference object
7 second scale plate
8 position-information specifying device
10 vehicle
41 first scale
42 first scale plate image
71 second scale
72 second scale plate image
81 input unit
82 storing unit
83 control unit

What is claimed is:

1. A position-information specifying method comprising:
   a step for obtaining an object image photographed by a first photographing means mounted in a movable body having a predetermined distortion characteristic, a predetermined distortion being caused on the object image due to the predetermined distortion characteristic;
   a step for obtaining a first scale plate image corresponding to an image obtained when a first scale plate, which has a first scale and is arranged so as to be opposed to a second photographing means having the predetermined distortion characteristic at a first distance, is photographed by the second photographing means;
   a step for overlapping the first scale plate image and the object image with each other;
   a step for measuring an image-size of a first reference object, which is appeared on the object image and has a first predetermined size, by using the first scale of the first scale plate image; and
   a step for calculating a first target distance between the first photographing means and the first reference object, based on the image-size of the first reference object, the first predetermined size, and the first distance.

2. The position-information specifying method according to claim 1, further comprising:
   a step for calculating two first target distances between the first photographing means and the first reference object with respect to two object images photographed at a predetermined time span; and
   a step for calculating a velocity of the first reference object by dividing a difference between the two first target distances by the predetermined time span.

3. The position-information specifying method according to claim 2, further comprising:
   a step for measuring an image-size of a second reference object, which is appeared on the object image and is an immovable object having a second predetermined size, by using the first scale of the first scale plate image;
   a step for calculating a second target distance between the first photographing means and the second reference object, based on the image-size of the second reference object, the second predetermined size, and the first distance;
   a step for calculating a velocity of the first photographing means by dividing, by a predetermined time span, a difference between the two second target distances with respect to two object images photographed at the predetermined time span; and
   a step for calculating an absolute velocity of the first reference object by subtracting the velocity of the first photographing means from the velocity of the first reference object.

4. The position-information specifying method according to claim 1, further comprising:
- a step for arranging a second scale plate having a second scale so as to be opposed to the first scale plate at a second distance apart from the first scale plate;
- a step for obtaining a second scale plate image which is obtained when the first scale plate and the second scale plate are photographed by the second photographing means; and
- a step for calculating the first distance, based on the first scale on the second scale plate image, the second scale on the second scale plate image, and the second distance.

5. The position-information specifying method according to claim 1, wherein the first photographing means is used as the second photographing means.

6. The position-information specifying method according to claim 1, further comprising a step for calculating a horizontal distance between the first photographing means and the first reference object, based on a difference between a height of the first photographing means and a height of the first reference object, and the calculated first target distance.

7. The position-information specifying method to claim 1, further comprising a step for calculating at least one of a driving tendency of a driver of the vehicle and performance change information of the vehicle, based on the calculated first target distance, when the first photographing means is mounted on the vehicle.

8. A position-information specifying device comprising:
- a storing unit configured to store an object image photographed by a first photographing means mounted in a movable body having a predetermined distortion characteristic, a predetermined distortion being caused on the object image due to the predetermined distortion characteristic; a first scale plate image corresponding to an image obtained when a first scale plate, which has a first scale and is arranged so as to be opposed to a second photographing means having the predetermined distortion characteristic at a first distance, is photographed by the second photographing means; and first reference object information with respect to a first reference object having a first predetermined size;
- an overlapping unit configured to overlap the first scale plate image and the object image with each other;
- a specifying unit configured to specify the first reference object, which is appeared on the object image, while referring to the first reference object information;
- a measuring unit configured to measure an image-size of the specified first reference object by using the first scale of the first scale plate image; and
- a calculating unit configured to calculate a first target distance between the first photographing means and the first reference object, based on the image-size of the first reference object, the first predetermined size, and the first distance.

9. The position-information specifying device according to claim 8, wherein the calculating unit calculates two first target distances between the first photographing means and the first reference object with respect to two object images photographed at a predetermined time span; and calculates a velocity of the first reference object by dividing a difference between the two first target distances by the predetermined time span.

10. The position-information specifying device according to claim 9, wherein the storing unit further stores second reference object information with respect to a second reference object, which is an immovable object having a second predetermined size,
- wherein the specifying unit specifies the second reference object, which is appeared on the object image, while referring to the second reference object information,
- wherein the measuring unit measures an image-size of the specified second reference object by using the first scale of the first scale plate image;
- wherein the calculating unit calculates a second target distance between the first photographing means and the second reference object, based on the image-size of the second reference object, the second predetermined size, and the first distance;
- wherein the calculating unit calculates a velocity of the first photographing means by dividing, by the predetermined time span, a difference between two second target distances with respect to two object images photographed at the predetermined time span; and
- wherein the calculating unit calculates an absolute velocity of the first reference object by subtracting the velocity of the first photographing means from the velocity of the first reference object.

11. The position-information specifying device according to claim 8, further comprising a step for calculating a horizontal distance between the first photographing means and the first reference object, based on a difference between a height of the first photographing means and a height of the first reference object, and the calculated first target distance.

12. The position-information specifying device according to claim 8 further comprising a step for calculating at least one of a driving tendency of a driver of the vehicle and performance change information of the vehicle, based on the calculated first target distance, when the first photographing means is mounted on the vehicle.

13. A computer readable medium storing on a non-transitory, non-volatile memory instructions executable by a computer, wherein execution of the instructions implements a position-information specifying method comprising storing an object image photographed by a first photographing means mounted in a movable body having a predetermined distortion characteristic, a predetermined distortion being caused on the object image due to the predetermined distortion characteristic; a first scale plate image corresponding to an image obtained when a first scale plate, which has a first scale and is arranged so as to be opposed to a second photographing means having the predetermined distortion characteristic at a first distance, is photographed by the second photographing means; and first reference object information with respect to a first reference object having a first predetermined size;
- a step for overlapping the first scale plate image and the object image with each other;
- a step for specifying the first reference object, which is appeared on the object image, while referring to the first reference object information;
- a step for measuring an image-size of the specified first reference object by using the first scale of the first scale plate image; and
- a step for calculating a first target distance between the first photographing means and the first reference object, based on the image-size of the first reference object, the first predetermined size, and the first distance.

14. The computer readable medium according to claim 13, wherein the calculating step calculates two first target distances between the first photographing means and the first reference object with respect to two object images photographed at a predetermined time span; and calculates a velocity of the first reference object by dividing a difference between the two first target distances by the predetermined time span.

15. The computer readable medium according to claim 14, wherein the computer further stores second reference object information with respect to a second reference object, which is an immovable object having a second predetermined size,
- wherein the specifying step specifies the second reference object, which is appeared on the object image, while referring to the second reference object information,
- wherein the measuring step measures an image-size of the specified second reference object by using the first scale of the first scale plate image;
- wherein the calculating step calculates a second target distance between the first photographing means and the second reference object, based on the image-size of the second reference object, the second predetermined size, and the first distance;
- wherein the calculating step calculates a velocity of the first photographing means by dividing, a predetermined time span, a difference between two second target distances with respect to two object images photographed at the predetermined time span; and
- wherein the calculating step calculates an absolute velocity of the first reference object by subtracting the velocity of the first photographing means from the velocity of the first reference object.

16. The computer readable medium according to claim 13, further comprising a step for calculating a horizontal distance between the first photographing means and the first reference object, based on a difference between a height of the first photographing means and a height of the first reference object, and the calculated first target distance.

17. The computer readable medium according claim 13, further comprising a step for calculating at least one of a driving tendency of a driver of the vehicle and performance change information of the vehicle, based on the calculated first target distance, when the first photographing means is mounted on the vehicle.

18. The position-information specifying method according to claim 1, wherein the first photographing means mounted in a movable body comprises a cell phone camera.

19. The position-information specifying device according to claim 8, wherein the first photographing means mounted in a movable body comprises a cell phone camera.

20. The computer readable medium according to claim 13, wherein the first photographing means mounted in a movable body comprises a cell phone camera.

* * * * *